United States Patent
Page et al.

[11] Patent Number: 5,841,932
[45] Date of Patent: Nov. 24, 1998

[54] OPTICAL FIBER COIL AND METHOD OF WINDING

[75] Inventors: Jerry L. Page, Alto; David R. Bina, Comstock Park; Douglas Milliman, Hastings, all of Mich.

[73] Assignee: Honeywell Inc., Minneapolis, Minn.

[21] Appl. No.: 668,485

[22] Filed: Jun. 21, 1996

[51] Int. Cl.⁶ ..................................................... G02B 6/02
[52] U.S. Cl. ........................ 385/134; 242/160.4; 385/123
[58] Field of Search ............................ 385/115, 123, 385/128, 134, 147; 356/350; 242/118, 159, 160.1–160.4, 166, 168, 169, 174, 176, 600, 614

[56] References Cited

U.S. PATENT DOCUMENTS

| | | | |
|---|---|---|---|
| 3,636,990 | 1/1972 | Eminger et al. | 140/92.1 |
| 4,120,588 | 10/1978 | Chaum | 356/350 |
| 4,699,451 | 10/1987 | Mohr | 356/350 |
| 4,743,115 | 5/1988 | Arditty et al. | 242/445.1 |
| 4,781,461 | 11/1988 | Baron et al. | 356/350 |
| 4,793,708 | 12/1988 | Bednarz | 356/350 |
| 4,856,900 | 8/1989 | Ivancevic | 356/350 |
| 4,883,337 | 11/1989 | Dahlgren | 385/134 |
| 4,928,894 | 5/1990 | Ohno et al. | 242/440.1 |
| 4,955,688 | 9/1990 | Chapin et al. | 385/123 |
| 5,168,539 | 12/1992 | Negishi et al. | 385/123 |
| 5,179,613 | 1/1993 | Cronk | 385/128 |
| 5,181,270 | 1/1993 | Hsu et al. | 385/134 |
| 5,220,632 | 6/1993 | LoStracco | 385/134 |
| 5,245,687 | 9/1993 | Usui | 385/134 |
| 5,351,900 | 10/1994 | Torney | 242/445.1 |
| 5,475,774 | 12/1995 | Goettsche et al. | 385/123 X |
| 5,506,923 | 4/1996 | Goettsche et al. | 385/115 |
| 5,528,715 | 6/1996 | Goettsche et al. | 385/115 |
| 5,545,892 | 8/1996 | Bilinski et al. | 385/128 X |

FOREIGN PATENT DOCUMENTS

WO 93/11406   6/1993   WIPO .

OTHER PUBLICATIONS

Frigo, Micholas J., "Compensation of Linear Sources of Non–Reciprocity in Sagnac Interfermoters" Reprint of Fiber Optic and Laser Sensors I, Proc. SPIE, vol. 412, 268–271 (1983). [No Month].

Lenders, W.L.,"The Orthocyclic Method of Coil Winding" Philips Technical Review, vol. 23, 1961/62 No. 12, pp. 365–379, Oct. 16, 1962.

Primary Examiner—John D. Lee
Attorney, Agent, or Firm—John G. Shudy, Jr.

[57] ABSTRACT

A fiber optic sensor coil is wound from a length of optical fiber with the mid-point of the optical fiber at the mid-point of the innermost layer of the coil and subsequent layers of the coil each have alternating turns of the two sections of the fiber emanating from the mid-point. The layers of alternating turns are formed by first winding a portion of one segment in such a fashion that adjacent turns are spaced apart by a distance equivalent to the diameter of the optical fiber. The layer is completed by winding a portion of the other segment such that the turns of the other segment are disposed between adjacent turns of the one segment. The number of turns in adjacent layers are unequal such that the turns of a next layer are arranged in grooves formed between two adjacent turns of optical fiber in the previous layer.

64 Claims, 8 Drawing Sheets

OPTICAL FIBER COIL AND METHOD OF WINDING

BACKGROUND OF THE INVENTION

1. Related Application

This application is a continuation-in-part application of application Ser. No. PCT/US93/12454, filed Dec. 22, 1993, entitled Optical Fiber Coil and Method of Winding.

2. Field of the Invention

This invention relates to optical fiber coils and to methods of manufacture thereof, and more particularly, to an improved coil pattern.

3. Description of Related Art

Fiber optic sensor coils are used, inter alia, in fiber optic gyroscopes to provide an optical output signal used in determining rotation of a vehicle (e.g. an airplane) about an axis of rotation. A typical fiber optic gyroscope uses three sensor coils to sense rotation about each of three orthogonal axes. The fiber optic gyroscope is typically configured as a Sagnac interferometer including a light source providing an optical signal, a multi-turn coil of optical fiber, referred to as a fiber optic ring, and electronic read-out and control circuits. The optical signal is first applied to an optical beam splitter/combiner which provides two identical optical output signals, each of which is applied to one end of the fiber optic coil. The two optical signals travel through the coil in opposite directions and are recombined at the beam splitter/combiner. A rotation of the fiber optic coil about its wound, or longitudinal axis will result in a phase shift between the counter-propagatory optical signals traveling through the coil. This phase shift is known as the Sagnac effect phase shift. The Sagnac effect can be explained by relativistic theory which shows that a wave traveling through a rotating coil in the direction of rotation requires more time to traverse the path than a wave traveling opposite to the direction of rotation. This time difference is manifested by phase shift interference pattern of the recombined optical signal. In an optical gyro, the magnitude of the phase shift is determined by analysis of the recombined signal as applied to an output optical detector. The detector output is translated into electrical output signals representing rotation.

The phase shift detected at the output detector may be considered as consisting of two parts. The first part is the Sagnac effect phase shift. The other part of the detected phase shift is due to perturbations in the optical fiber caused by environmental factors. The Sagnac phase shift which defines the magnitude and direction of rotation is relatively small, such that any significant phase shift due to environmental factors may obscure an accurate reading of the Sagnac effect phase shift. It is therefore desirable to minimize the effect of environmental perturbations on the detected phase shift of the recombined optical signal.

The two optical signals emanating from the splitter/combiner in response to the single optical input signal are in phase and are applied at opposite ends of the coiled fiber and traverse the fiber in opposite directions. The undesirable phase shift effects occur when environmental perturbations affect one of the light signals differently than the other. It is generally recognized that environmental perturbations cannot be eliminated, but that their effect can be minimized if these perturbations are applied equally to the counter propagatory light signals. A known approach to reducing the effect of environmental perturbations is to build a symmetry in the sensing coils. Known sensing coils include dipole, quadrupole, and octupole windings. In these coils the midpoint of a length of optical fiber is placed near one side flange of a spool and the two optical fiber segments emanating from the midpoint, referred to as the forward segment and the reverse segment, are then wound around the coil in opposite directions. In the case of a dipole, the forward and reverse segments are wound on the spool in alternating layers. In the quadrupole, a layer of the forward segment is followed by two layers of the reverse segment, followed by two layers of the forward segment, and so on. In an octupole configuration, two layers of the reverse segment are sandwiched between two layers of the forward segment followed by another set of four layers in which two layers of the forward segment are sandwiched between layers of the reverse segment. All of these various configurations are attempting to introduce a symmetry such that an environmental perturbation of the coil will affect the counter-propagating light signals in the same manner. However, when the coil is built up of alternating layers or alternating pairs of layers of the forward and reverse segments, the forward and reverse segments are not necessarily affected in the same way by the environmental perturbations. This may be better understood by considering the nature of the environmental perturbations.

Environmental perturbations may be due to mechanical strain, vibration, shock and temperature changes. It is known, that predominantly two types of temperature perturbations have to be dealt with, namely, those due to radial temperature gradients and those due to axial temperature gradients. A third gradient type, transverse to the wound (longitudinal) axis of the spool, is a less significant problem. As the name implies, with a radial temperature gradient, the temperature varies radially such that an optical fiber segment comprising a portion of the innermost layer of the coil is at a different temperature than fiber segments in layers which are a distance removed from the core of the coil. An axial gradient extends along the wound axis of the spool. It is therefore desirable to avoid significant axial and radial distances between segments of the optical fiber which are the same distance from the center point of the length of the fiber such that corresponding segments of the forward and reverse segment of the coil experience the same environmental perturbations.

SUMMARY OF THE INVENTION

These and other problems of the prior art are overcome in accordance with the present invention in a fiber optic sensing coil by constructing each of the layers of the coil of alternating turns of the forward and reverse segments. In accordance with one aspect of the invention, the coil comprises an inner layer wound from opposite ends of the length of fiber. The optical fiber has a midpoint and the midpoint is located at the approximate midpoint of the innermost layer. Advantageously, the positioning of the midpoint of the fiber at the midpoint of the innermost layer allows the coil to be wound in opposite directions from the midpoint and tends to reduce variations due to environmental perturbations. A substantial reduction in the effects of environmental perturbations over prior art coils has been observed.

In accordance with another aspect of the invention, adjacent layers of optical fibers are arranged such that the turns of optical fiber in one layer rest in grooves formed by adjacent turns in the preceding layer. In one embodiment of the invention, adjacent layers of optical fibers have unequal numbers of turns to allow fibers of a next layer to be disposed in grooves formed by the turns of the preceding layer. In another embodiment, adjacent layers have equal numbers of turns with each laterally offset from the previous layer by a distance substantially equal to one-half fiber diameter, allowing fibers of a next layer to rest in grooves formed by adjacent turns in the preceding layer. Advantageously, such an arrangement adds stability to the coil and reduces its overall outside diameter.

In one particular embodiment of the invention, the pattern of alternate adjacent segments of the fiber is such that the second through the fifth layers of the coil each have a unique pattern with respect to any preceding layer and the patterns of the sixth through ninth layers correspond individually to the patterns of the second through the fifth layers, respectively, with the four-layer pattern configuration repeated in the remaining layers of the coil. In another embodiment of the invention, even numbered layers have corresponding patterns and alternating odd numbered layers have corresponding patterns. In yet another embodiment of the invention, all layers after the first layer are wound identically.

In a method of winding an optical fiber coil in accordance with the invention, the first layer is formed such that portions of the forward and reverse segments are disposed adjacent opposite side flanges of a spool. The second layer is formed by winding an alternate turns pattern of the forward segment of the fiber on the first layer such that adjacent turns of the forward segment are spaced apart by a predetermined distance and then winding a portion of the reverse segment in an alternate turns pattern on the first layer between the alternate turns pattern of the forward segment, thereby forming a layer of alternating turns of the forward and reverse segments. In accordance with a particular aspect of the invention, the second and additional layers are formed by winding the next layer such that the turns of the next layer are disposed in grooves formed between turns of the preceding layer.

In a particular embodiment of the invention, the coil is wound on a spool and is treated with an adhesive to retain the shape of the core. The coil is subsequently removed from the spool to advantageously realize weight and volume savings and potentially improve coil performance.

In another embodiment of the invention, the core is provided with a longitudinal groove to provide an improved first layer of the coil. In yet another embodiment, the core is provided with circumferentially-extending parallel grooves.

BRIEF DESCRIPTION OF THE DRAWING

The invention is described in detail in the following paragraphs with reference to the drawing in which.

DETAILED DESCRIPTION

Figure 1:
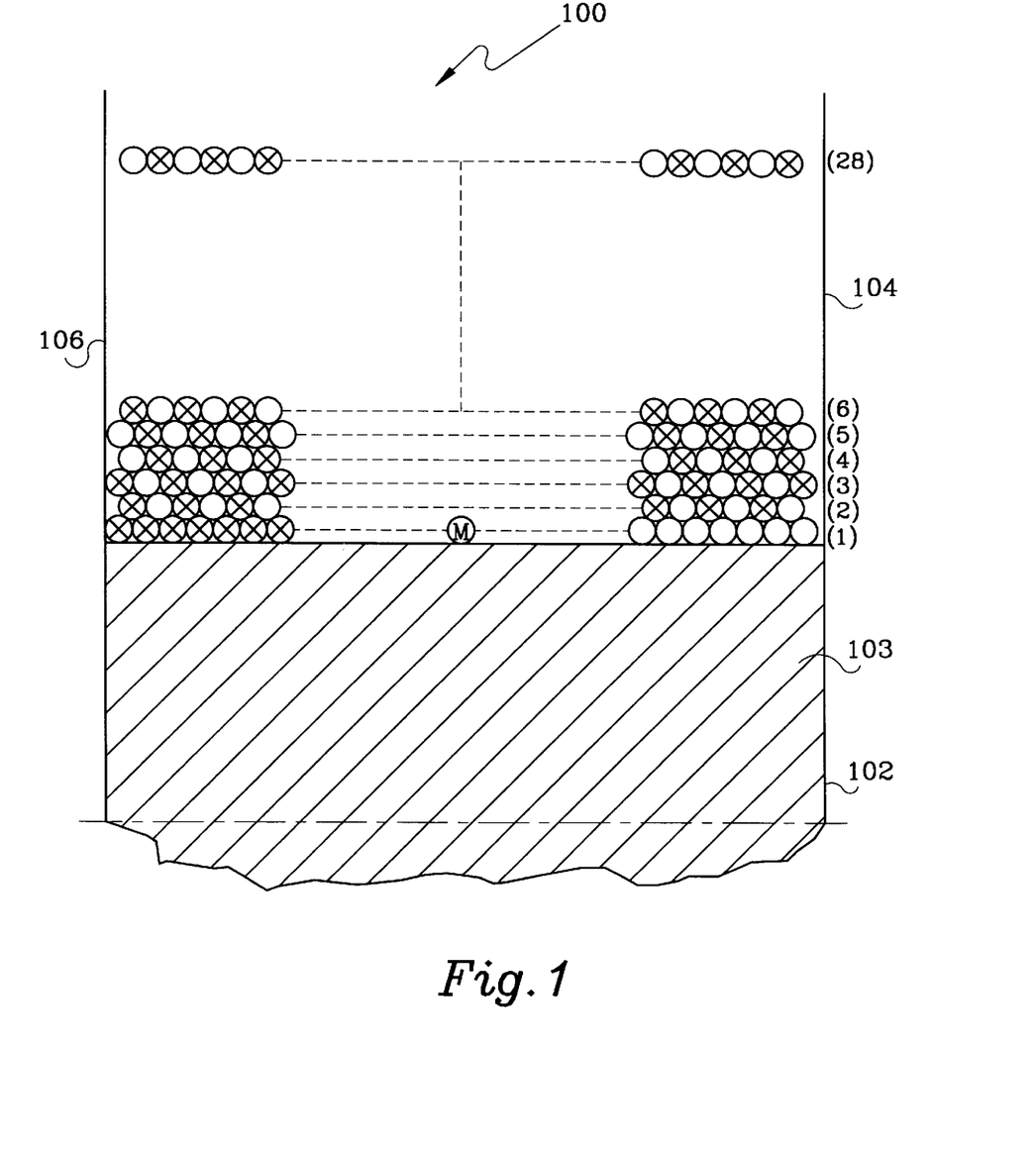
FIG. 1 is a schematic representation of a cross-section of a portion of sensing coil constructed in accordance with the principles of this invention.

FIG. 1 is a schematic representation of a cross section of a sensing coil 100 wound on a spool 102 having a core 103 and opposing flanges 104, 106. The coil is constructed as an optical fiber sensing coil for use, for example, in a fiber optic gyro. The coil consists of a continuous fiber of a selected length having its midpoint adjacent the core of the spool and its ends exposed. The two optical fiber segments extending from the midpoint, referred to as the forward segment and the reverse segment, are wound on the spool in opposite directions. In use, as explained in the background of the invention, two identical optical signals are individually applied to opposite ends of the coil and propagate through the forward and reverse segments in opposite directions.

FIG. 1 depicts a coil 100 having 28 layers, each layer consisting of a number of turns of oppositely wound fiber segments. For the sake of this description, turns of the forward fiber segment are depicted as extending away from the viewer and identified by X's and turns of the reverse segment are depicted as extending toward the viewer and are referred to as O's. The coil 100 shown in FIG. 1 has a first layer (1) having an odd number of turns, e.g., 99 turns. The turns extend in opposite direction from the midpoint of the fiber, represented by M, toward the opposing flanges 104, 106. The next layer (2) has an even number of alternate, oppositely directed turns of the optical fiber. The outermost turns of that layer are preferably displaced from each of the flanges 104, 106 by a distance of approximately one-half of the diameter of the fiber such that the second layer has one fewer turn than the first layer. This arrangement of layers is repeated such that all even numbered layers have one fewer turn than the odd numbered layers. This allows the fiber turns of the next layer to be positioned in the naturally formed grooves between adjacent turns of the previous layer. This arrangement of layers lends stability to the coil. It also tends to reduce the overall coil diameter, which is important in space craft and other applications with substantial space limitations. Adjacent turns may be spaced apart by a selected distance to form more pronounced and deeper grooves for the turns of the next layer.

As depicted in FIG. 1, the first layer, layer 1, consists of half of each of the forward and reverse segments. After the first layer, a particular pattern of forward and reverse segment turns is developed. The pattern of turns in the layers shown in FIG. 1 is such that it is repeated every fourth layer. The pattern of turns in each of the layers 2 through 5 is unique with respect to any of the preceding layers. After layer 5, however, the pattern of turns in layers 2 through 5 is repeated in subsequent groups of four layers. Thus, layer 6 has the same pattern of turns as layer 2. The other layers shown in FIG. 1, layer 28, has the same pattern as layer 4.

Figure 2:
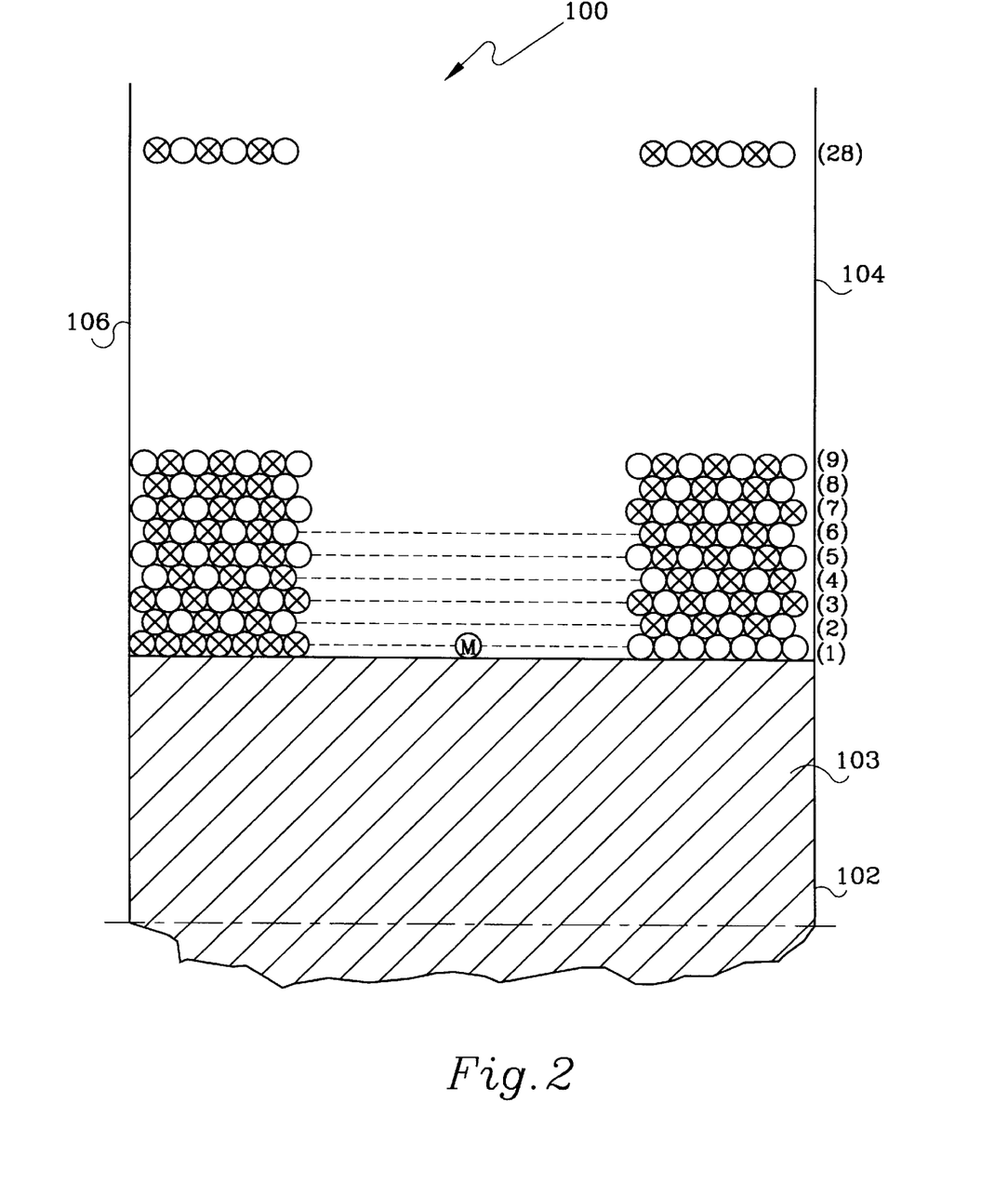
FIGS. 2 through 4 are alternate embodiments of the invention showing alternate coil winding patterns.
Figure 3:
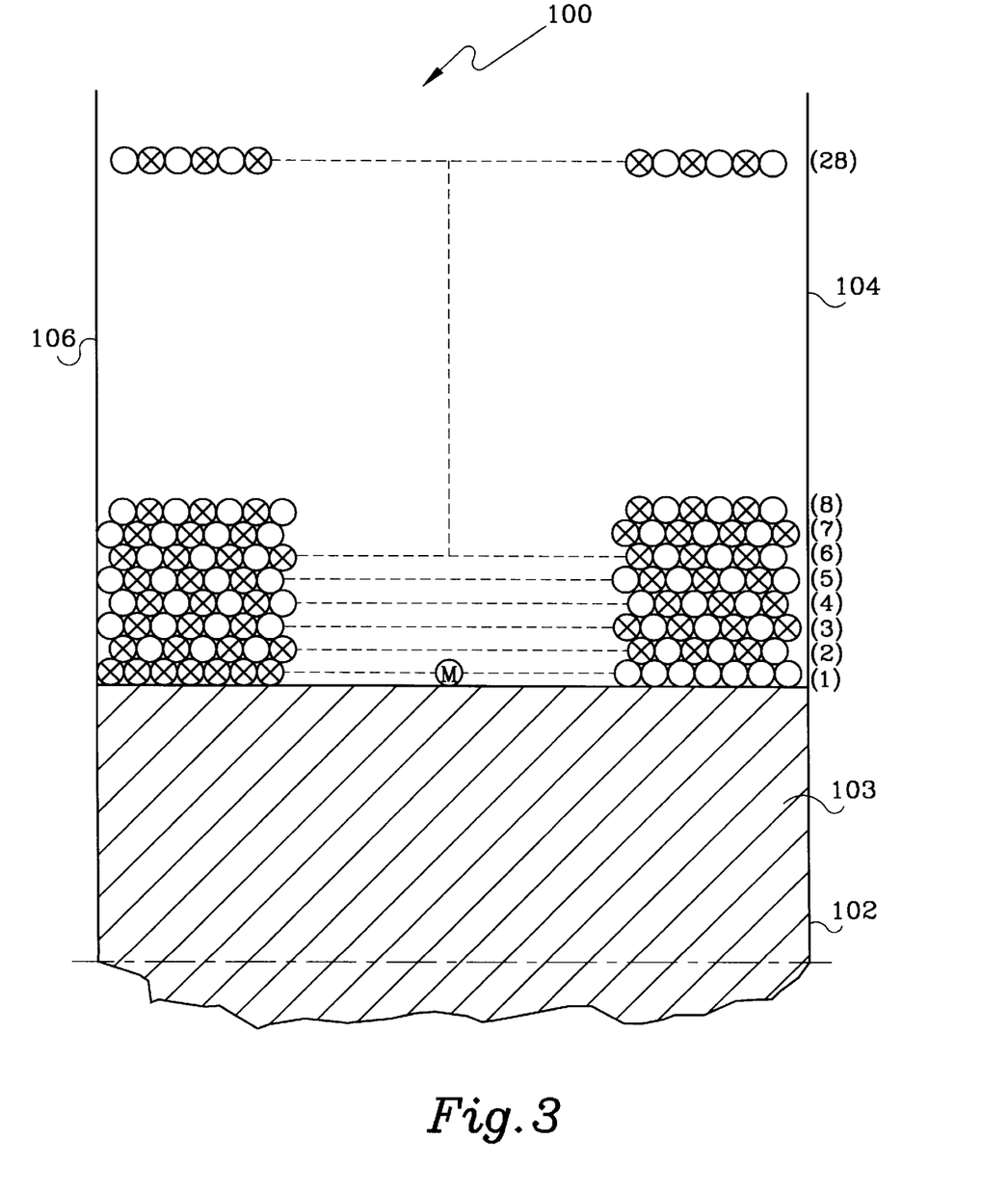

Other patterns of alternating turns of the forward and reverse segment may be created. In the pattern shown in FIG. 2, the even rows, e.g. 2, 4, 6, all have the same turns pattern, whereas the odd numbered layers, i.e., 3, 5, 7, and 9 have alternating turns patterns. Thus the pattern of layer 3 is repeated in layers 7, 11, etc., and the pattern of layer 5 is repeated in layers 9, 13, etc. Other patterns, besides those shown in FIG. 1 and FIG. 2 can be readily envisioned. The pattern shown in FIG. 1 and FIG. 2 are for an arrangement in which the first layer adjacent to the core 103 has an odd number of turns. FIG. 3 shows an arrangement wherein the first layer, layer 1, has an even number of turns. In that configuration, the odd numbered layers, i.e., 3, 5, etc., have the same turns pattern and the even numbered layers, i.e., 2, 4, 6, etc., have an alternate pattern. These turns patterns are repeated in every fourth layer. Thus, layer 6 has the same pattern as layer 2, layer 8 has the same pattern as layer 4, and so on. The formation of the turns patterns in the layers is a function of the method of winding the coil 100.

It is also possible that the fiber has different diameters in different areas. For example, a depolarizer may be inserted at various positions in the fiber. This may result in differing numbers of turns of the fiber in certain layers.

Figure 4:
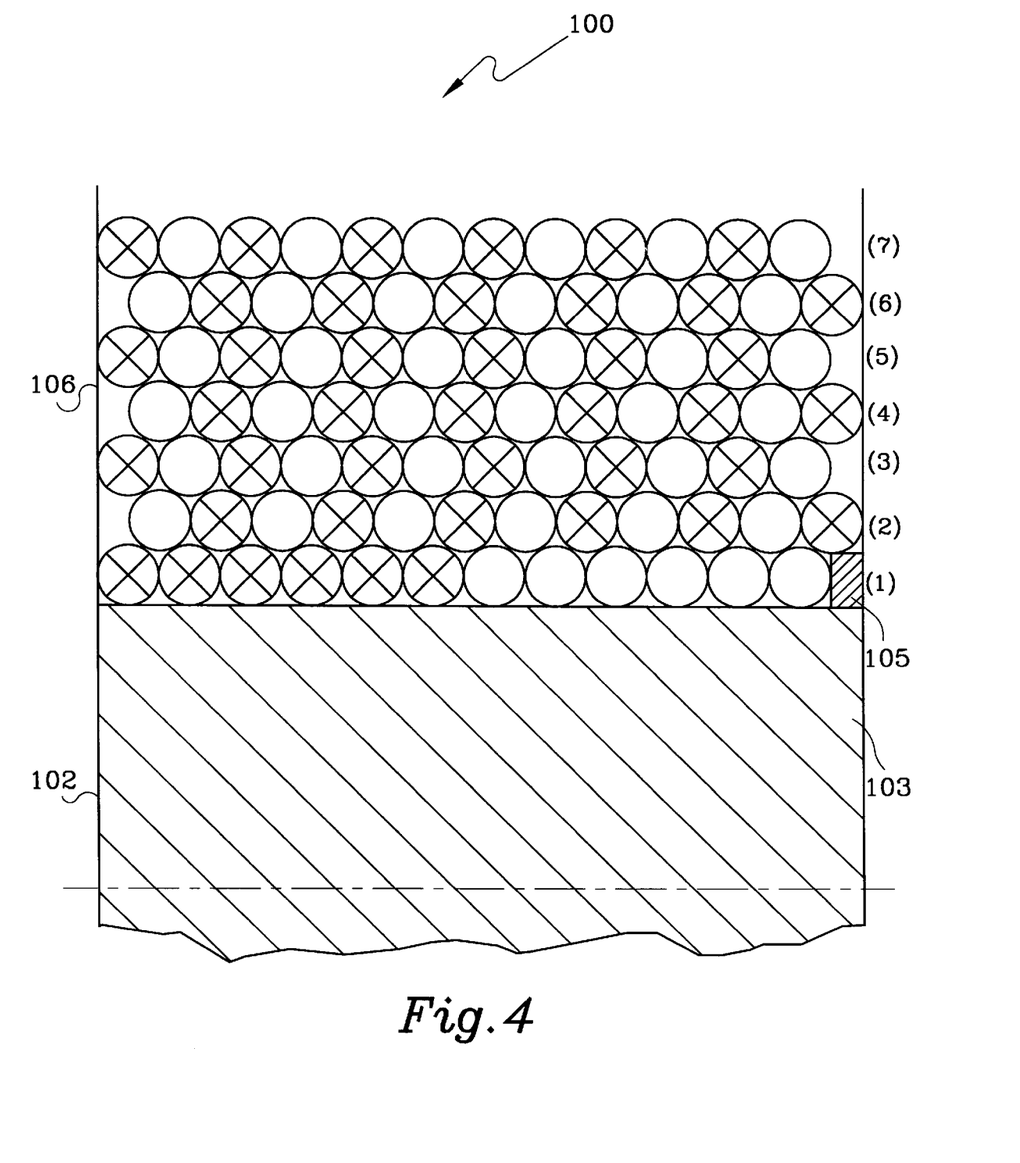

FIG. 4 is a cross-sectional schematic representation of a part of a sensing coil 100 wound in a fashion such that all layers have the same number of turns while the fiber turns of adjacent layers are laterally displaced from each other by a distance approximately equal to one-half of the fiber diameter. In this particular configuration, the even numbered layers have corresponding configurations of forward and reverse segment turns and the odd numbered layers, beginning with the third layer, have corresponding configurations of forward and reverse segment turns. The total number of turns in each layer may be even or odd. In the arrangement of FIG. 4, the first layer is displaced from the right flange 104 by a distance substantially equal to one-half fiber diameter. A spacer 105, having a lateral dimension of approximately one-half the fiber diameter, may be provided adjacent to core 103 and the right flange 104 to provide the desired spacing of the right most turn of the first layer from the right flange 104. Layer 2 is displaced from the left flange 106 by a distance substantially equal to one-half the fiber diameter with turns of the second layer disposed in the grooves formed by the turns of the first layer. Subsequent layers are alternately spaced away from the right flange 104 and the left flange 106 to maintain the one-half fiber diameter offset between adjacent layers.

Figure 5:
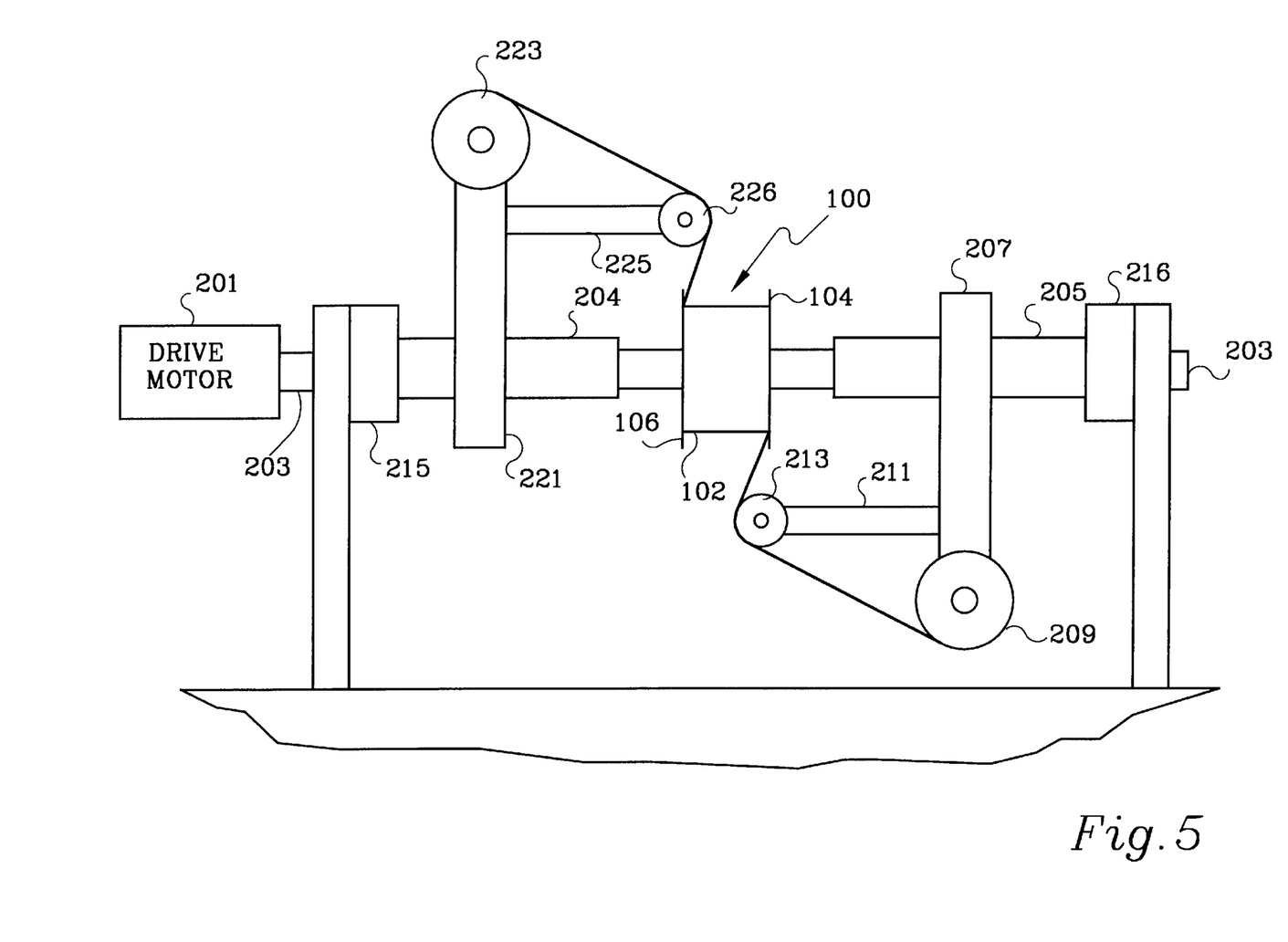
FIG. 5 is a schematic representation of apparatus for winding a fiber optic coil in accordance with the invention.

FIG. 5 is a schematic representation of an apparatus for winding the coil 100. As shown in FIG. 5, the spool 102 is mounted on a drive shaft 204 driven by a drive motor 203. When a fiber is to be wound around the spool 102, the fiber is first wound, starting with opposite ends of the fiber, on two separate supply spools 209 and 223. The supply spools 209 and 223 are mounted on left and right support brackets 207 and 221, respectively. In a preferred method of winding the coil 100, the length of fiber on one of the supply spools, e.g. the right supply spool 209, is equal to one-half of the total length of the fiber plus the length corresponding to one half of the first layer, layer 1. The midpoint between the two supply spools may be placed adjacent one of the flanges, for example, the left flange 106 and wound across to the right flange 104. The midpoint of the length of fiber will then be positioned substantially in alignment with the midpoint of the spool 102, as depicted in FIG. 1. Thereafter, the remainder of the coil 100 is wound from the two supply spools 209 and 223.

The left and right support brackets 221 and 207 are attached to the corresponding left and right shaft sections 204 and 205, respectively. Clutches 215 and 216 are provided to selectively engage shaft sections 204 and 205, respectively, with drive shaft 203 for rotation with the spool 102. The optical fiber from supply spool 209 on bracket 207 is fed via a roller 213 to the spool 102. The roller 213 is supported by means of a bracket 211 attached to the bracket 207. In a similar fashion, bracket 225 connected to bracket 221 supports a roller 226 to guide the optical fiber from spool 223 on bracket 221 to the spool 102. When the coil 100 is to be wound from supply spool 209 mounted on the right bracket 207, the left clutch 215 is engaged to lock the left shaft section 204 and bracket 221 to drive shaft 203 for rotation with the spool 102. The right clutch is disengaged from drive shaft 204 and is held in a fixed position. Similarly, when the coil 100 is to be wound from supply spool 223 on bracket 221, clutch 216 is engaged to lock the right shaft section 205 and bracket 207 to drive shaft 203 for rotation with the spool 102. Clutch 215 is disengaged and bracket 221 is held stationary. Motor 201 is reversible to allow coil 100 to be turned in either the clockwise or counterclockwise direction.

The procedure for winding the coil 100 to obtain the pattern shown in FIG. 1, using the apparatus represented in FIG. 5, is described further below. In the following description, the spool 223 will be referred to as the X spool, representing the forward segment, and the spool 209 will be referred to as the O spool, representing the reverse segment of the optical fiber sensing coil 100. As shown in FIGS. 1 through 4, the turns in adjacent layers are offset from each other. This facilitates the winding process, as outlined below, by causing turns of a next layer to follow grooves provided in the preceding layer. This is especially helpful in forming a spaced-apart turns pattern wherein adjacent turns are spaced apart by a distance equal to or slightly greater than the diameter of the fiber, as described further below.

The procedure for winding a coil on a spool in the configuration as shown in FIG. 1 comprises the following steps:

1. Winding the reverse segment O, supply spool with a length of fiber corresponding to one-half of the total length of the fiber plus the length required to form one-half of the first layer of the coil on the spool 102, and mark the endpoint of that segment.

2. Winding the remainder of the optical fiber on the forward segment X, supply spool.

3. Placing the X spool on the left feed bracket 221 and placing the O spool on the right feed bracket 207.

4. Starting with the marked position of the optical fiber adjacent the left flange 106 of spool 100, winding the first layer from the O supply spool in the counterclockwise direction, moving from left to right, to complete the first layer.

5. Winding one revolution in the counterclockwise direction from the O supply spool, adjacent the right flange 104, as part of the second layer.

6. Winding a spaced-apart alternate turns pattern in the clockwise direction from the X supply spool, moving from left to right.

7. Interchanging the X and O supply spools by moving the O supply spool from the right bracket 207 to the left bracket 221 and moving the X spool from the left bracket 221 to the right bracket 207.

8. Winding an alternate turns pattern in the counterclockwise direction from the O supply spool between the turns of the alternating pattern of X fiber, moving from right to left, to complete the second layer.

9. Winding a spaced-apart alternate turns pattern in the clockwise direction from the X supply spool, moving from right to left.

10. Interchanging the X and O supply spools by moving the X supply spool to the left bracket 221 and the O supply spool to the right bracket 207.

11. Winding an alternate turns pattern between the alternate turns of X fiber in the counterclockwise direction from the O supply spool, moving from left to right, to complete the third layer.

12. Winding a spaced-apart alternate turns pattern in the clockwise direction from the X supply spool, moving from left to right.

13. Interchanging the X and O supply spools by moving the X supply spool to the right bracket 207 and the O supply spool to the left bracket 221.

14. Winding an alternate turns pattern between the alternate turns of X fiber in the counterclockwise direction from the O supply spool, moving from right to left, to complete the fourth layer.

15. Winding a spaced-apart alternate turns pattern in the counterclockwise direction from the O supply spool, moving left to right.

16. Interchanging the X and O supply spools by moving the X supply spool to the left bracket 221 and the O supply spool to the right bracket 207.

17. Winding an alternate turns pattern between the alternate turns of the O fiber in the clockwise direction from the X spool, moving from right to left, to complete the fifth layer.

18. Repeating steps 5 through 17 for each of the groups of 4 layers (6) through (9), (10) through (13), etc., until the coil is completed.

As outlined above, the optical fiber sensing coil 100 is formed by winding an optical fiber on a spool 102 in the manner described herein. The completed coil 100 may be retained on the spool 102 and installed or used as an integrated assembly. Alternatively, the coil 100 may be removed from the spool 102 and installed or used as a freestanding coil. In a certain applications it is desirable to remove the spool 102 to realize weight and volume savings and potentially improve performance of the coil. The freestanding coil may be formed by applying a bonding agent to the fiber segments to bond adjacent turns and adjacent layers together in order to form a cohesive coil 100, wherein the windings of the fiber segments will be retained in proper relationship to each other. The process of bonding may be accomplished in a variety of methods which are well known in the art. A preferred method is to use optical fiber which has been pretreated with a bonding agent which possesses no adhesive properties until subjected to a curing process. Ideally, the bonding agent will not adhere to the spool on which the coil is wound during construction of the coil. The spool may also be treated with a release coating or agent to reduce or prevent adherence. Once a coil has been formed on a spool in the winding process outlined earlier herein, the combination of the coil 100 and the spool 102 is subjected to a curing process to activate a bonding agent thereby bonding adjacent layers of turns of the fiber to each other. After curing, either one or both of the spool flanges 104, 106 can be removed from the spool 102 and the coil 100 can then be removed from the core 103 to yield a freestanding coil. As an alternative, a potting compound may be used. Instead of fiber segments provided with a bonding agent, a potting compound may be applied to the completed coil 100 and induced in spaces between the turns of optical fiber in a known manner. Once the potting compound cures, the coil 100 may be removed from the spool 102 in the manner described above. Another alternative is to apply an adhesive bonding agent during the winding process that can be cured as part of winding each layer or in the completed coil.

A procedure for winding a coil in the configuration shown in FIG. 1 is described above. The following procedure may be used to obtain a freestanding fiber optic coil. In addition to steps 1 through 18 outlined above, the following steps may be executed:

Prior to the first step, step 1, of the procedure for winding a coil on a spool outlined above, the total length of the fiber is coated with an adhesive coating and after the last step, step 18 of the above procedure, the following additional steps may be executed:

1. Curing the completed fiber coil to activate the adhesive coating and bond individual turns of the fiber together.

2. Removing the flanges 104, 106.

3. Removing the completed coil from the spool core 103.

Alternatively, a bonding agent may be applied to the fiber during the winding process and cured on a layer-by-layer basis or after several layers or the the entire coil have been wound.

Figure 6:
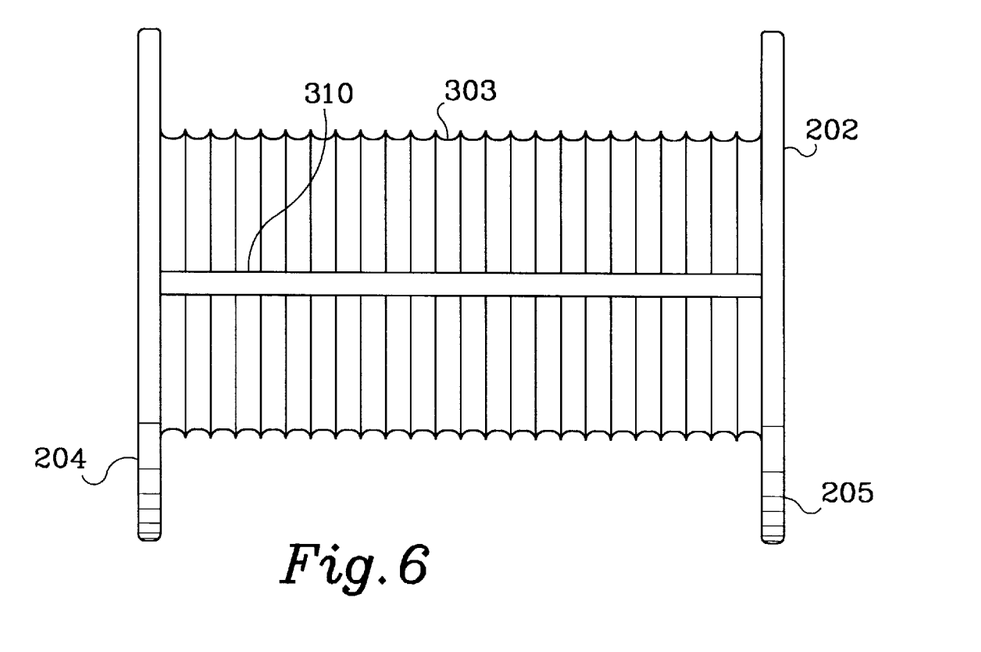
FIG. 6 is a side view representation of a spool adapted for winding a fiber optic coil.

FIG. 6 shows a spool 302 having a core 303 provided with a groove 310 extending between the opposing flanges 304, 305 and parallel to the center line of the core. In winding the core, the midpoint of the optical fiber is placed in the groove at the midpoint of the groove, i.e., equal distant from the flanges 302 and 304. The first layer of the coil to be formed on the core is formed by winding the portion adjacent one of the two flanges 302, 304 in the clockwise direction and winding the portion of the fiber adjacent the other of the two flanges in the opposite direction. The two portions are wound toward opposite sides with successive turns being spaced apart such that windings of the forward and reverse fiber sections are juxtaposed in the first layer in the same manner as other layers of the coil. The second and additional layers are wound in the same manner as described earlier with respect to FIGS. 1 through 4. Accordingly, alternating direction turns are disposed in juxtaposition in all layers, thereby further enhancing performance of the coil.

Figure 7:
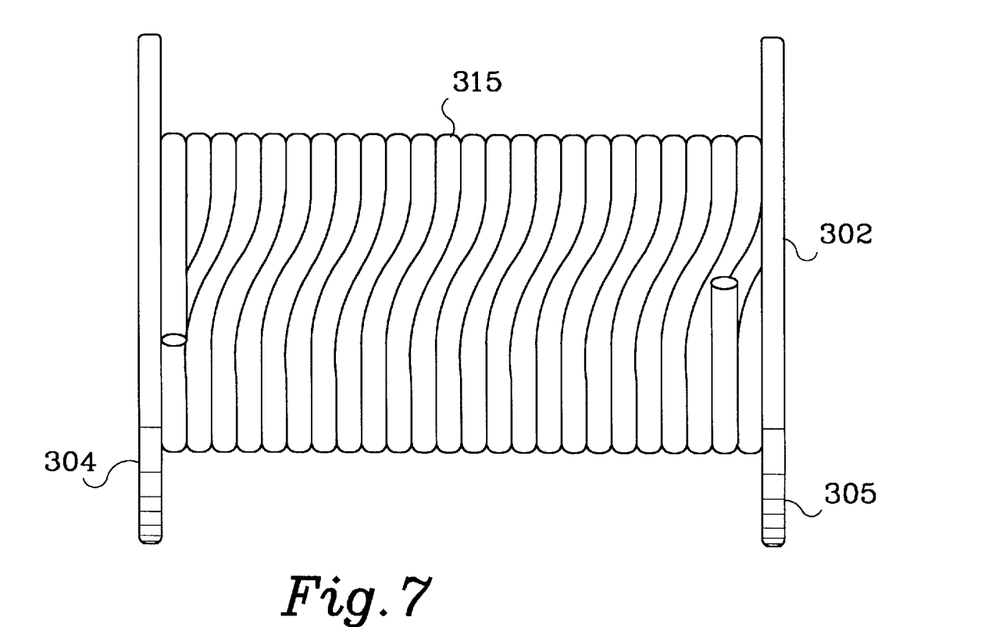
FIG. 7 is a side view of a coil would on the core of FIG. 6.
Figure 8A:
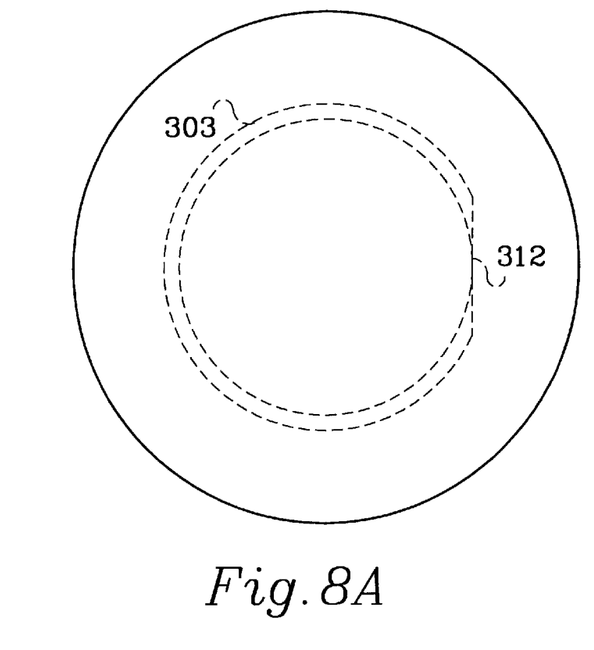
FIG. 8A is an end view of an alternate embodiment of a core.
Figure 8B:
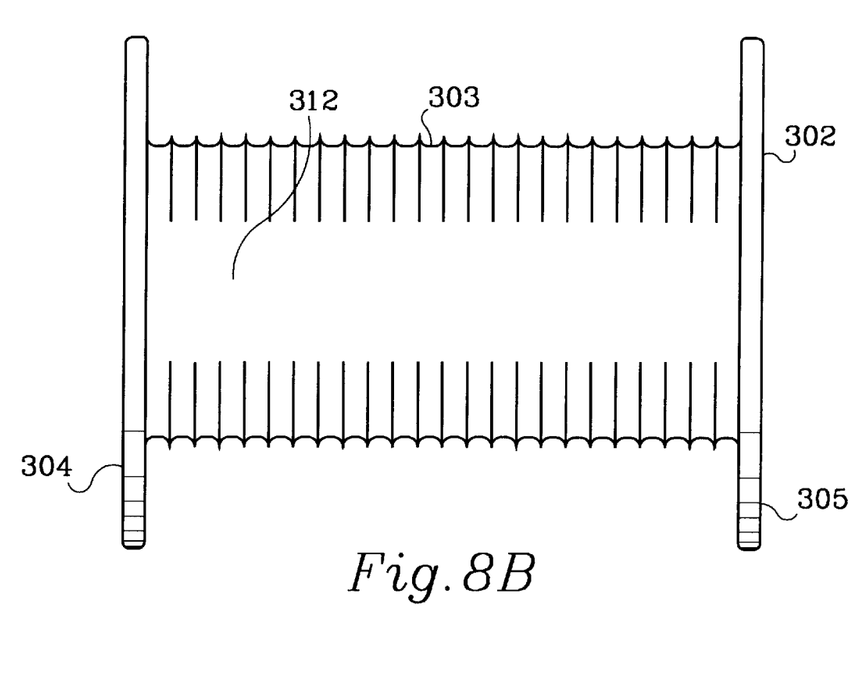
FIG. 8B is a side view of the core of FIG. 8A.
Figure 9:
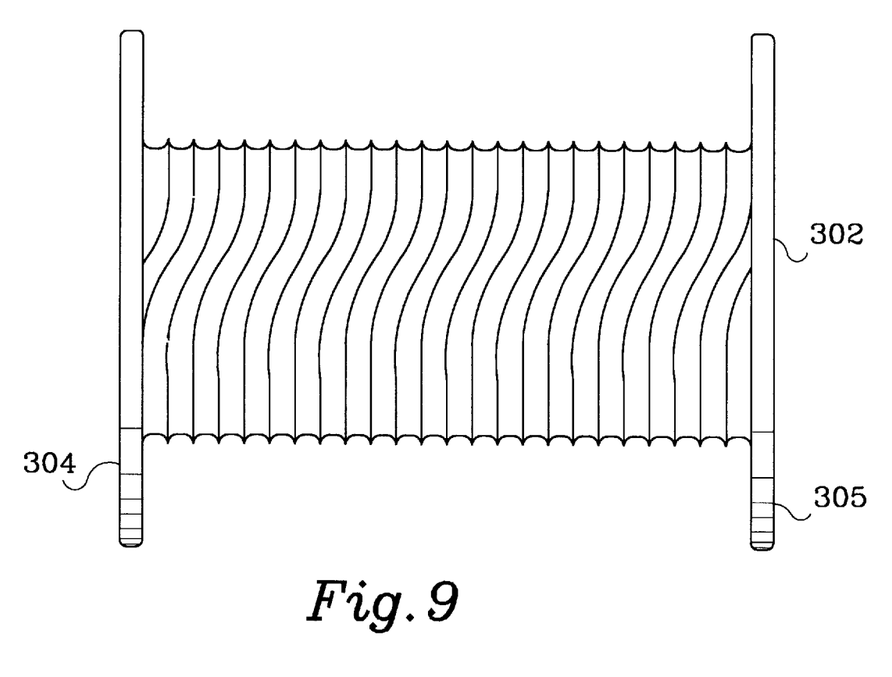
FIG. 9 is a side view of another alternate embodiment of a core.

A common difficulty in winding the first layer of fibers on a spool such as a spool 102 is to maintain the fibers in proper spaced relationship to each other. FIG. 6 shows a plurality of circumferentially extending grooves in the surface of the core 303. Such core grooves may be formed by machining, or grinding, or etching. The grooves are preferably parallel rather than helical and may be formed, for example, by electronic discharge machining, by introducing a conductive wire in tangential contact with the core and rotating the core. With the first layer of the core formed in the parallel grooves, adjacent turns of the optical fiber forming the innermost layer are parallel for essentially one complete revolution and then are displaced to one side by a distance equivalent to one diameter of the fiber. This concept is illustrated in FIG. 7 which is a side view of an optical fiber 305 wound on the core of FIG. 6, showing the area of displacement of the adjacent turns. The displacement to one side may be facilitated by the formation of a flat area 312 on the surface of the core wherein the grooves have been removed from the core by machine processing as depicted in FIGS. 8A and 8B. Alternatively, the displacement may be formed in the surface of the core by electronic discharge machining, or the like, in a manner such as depicted in FIG. 9.

It will be understood that the above-described arrangement is merely illustrative of the application of the principles of the invention and that numerous other arrangements may be devised by those skilled in the art without departing from the spirit and scope of the invention.

What we claim is:

1. A substantially symmetrically wound coil of optical fiber comprising:

a plurality of turns of a first segment of optical fiber wound in a clockwise direction and a plurality of turns of a second segment of optical fiber wound in the counterclockwise direction;

the turns of the first segment and of the second segment together forming a plurality of layers of turns of optical fiber; and at least one of the layers comprising alternate, adjacent turns of the first and second segments of optical fiber.

2. The coil in accordance with claim 1 and further comprising an inner layer having opposite ends and wherein the first and second segments each terminate in an end point and are joined at a midpoint of the optical fiber substantially equidistant from the end points and wherein the midpoint of the optical fiber is disposed between the opposite ends of the inner layer and substantially equidistant from the opposite ends of the inner layer.

3. The coil in accordance with claim 2 wherein the inner layer comprises a first layer of turns, wherein the coil further comprises second, third and fourth layers each having alternating, adjacent turns of the first and second segments and wherein the position of the turns of the first segment and of the second segment in the fourth layer correspond directly to the position of the turns of the first and second segments in the second layer.

4. The coil in accordance with claim 2 wherein the inner layer comprises a first layer of turns, wherein the coil further comprises second, third, fourth and fifth layers of alternating, adjacent turns of the first and second segments and wherein the position of the turns of the first segment in the fifth layer corresponds to the position of the turns of the second segment in the third layer and wherein the position of the turns of the second segment in the fifth layer corresponds to the position of the turns of the first segment in the third layer.

5. The coil in accordance with claim 2 wherein the inner layer comprises a first layer of turns, wherein the coil further comprises a second and a third layer and a plurality of additional layers of alternating, adjacent turns of the first and second segments and wherein turns of the first and second segments in even numbered layers correspond in position directly to the position of the turns of the first and second segments in the second layer and wherein turns of the first and second segments in odd numbered layers correspond in position directly to the positions of the turns of the first and second segments of the third and fifth layers.

6. The coil in accordance with claim 5 wherein the inner layer comprises an even number of turns of the optical fiber.

7. The coil in accordance with claim 1 wherein the coil has an axis of rotation and a greater part of each turn of the plurality of turns of the optical fiber has a tangential component extending perpendicular to the axis of rotation.

8. The coil in accordance with claim 1 and further comprising second, third, fourth and fifth layers of alternating, adjacent turns of the first and second segments and wherein the position of the turns of the first segment in the fifth layer corresponds to the position of the turns of the first segment in the third layer and wherein the position of the turns of the second segment in the fifth layer corresponds to the position of the turns of the second segment in the third layer.

9. A method of forming an optical fiber sensing coil comprising a plurality of layers by winding an optical fiber of predetermined length and diameter on a spool having axially spaced apart side flanges, the fiber having a forward segment and a reverse segment, the method comprising the steps of:

forming a first layer by winding a portion of the fiber on the spool such that portions of the forward and reverse segments are disposed adjacent opposite side flanges;

forming a second layer by winding a portion of the forward segment in an alternate turns pattern on the first layer such that adjacent turns of the forward segment are spaced apart by a distance substantially equal to the diameter of the optical fiber and winding a portion of the reverse segment in an alternate turns pattern on the first layer between the turns of the alternate turns pattern of the forward segment.

10. The method in accordance with claim 9 wherein the spool comprises a spool midpoint disposed axially equidistant from the side flanges and the fiber has opposite ends and a fiber midpoint substantially equidistant from the opposite ends and the forward and reverse segments extend in opposite directions from the fiber midpoint, and wherein the step of forming the first layer comprises winding the first layer such that the fiber midpoint is in substantial alignment with the spool midpoint.

11. The method in accordance with claim 9 and further comprising the step of forming additional layers with each comprising alternate turns of the forward segment and of the reverse segment.

12. The method in accordance with claim 11 wherein the steps of forming the second layer and the additional layers comprises forming a coil of adjacent layers with alternating odd and even numbers of turns.

13. The method in accordance with claim 12 wherein the steps of forming the second layer and the additional layers comprises winding a next layer such that the turns of the next layer are disposed in grooves formed between turns of the immediately preceding layer.

14. The method in accordance with claim 9 wherein the step of forming the second layer comprises winding the turns of the forward segment in a first rotational direction and winding the turns of the reverse segment in a second rotational direction, opposite to the first rotational direction.

15. The method in accordance with claim 9 and further comprising the step of winding an additional turn of the reverse segment adjacent one of the flanges to form a turn of a second layer before the step of forming the second layer.

16. The method in accordance with claim 9 wherein the step of forming the first layer comprises forming an odd number of turns of the optical fiber in the first layer and the step of forming the second layer comprises forming an even number of turns of the optical fiber in the second layer.

17. The method in accordance with claim 9 and further comprising the step of forming a third layer of alternating turns of the forward segment and of the reverse segment and the step of forming a fourth layer of alternating turns of the forward and reverse segments such that a section of the turns of the forward and reverse segments in the fourth layer, relative to the side flanges, correspond directly in position to the turns of the second layer, relative to the side flanges.

18. The method in accordance with claim 9 and further comprising the steps of forming third and fourth layers of alternating turns of the forward segment and the reverse segment such that the position of the turns of the forward segment of the fourth layer, relative to the side flanges, correspond to the position of the turns of the reverse segment of the second layer, relative to the side flanges, and the position of the turns of the reverse segment of the fourth layer, relative to the side flanges, corresponds to the position of the turns of the forward segment of the second layer, relative to the side flanges.

19. The method in accordance with claim 18 and further comprising the step of forming a fifth layer such that the position of the turns of the forward segment of the fifth layer, relative to the side flanges, correspond to the position of the turns of the reverse segment of the third layer, relative to the side flanges and the position of the turns of the reverse segment of the fifth layer, relative to the flanges, correspond the position of the turns of the forward segment of the third layer, relative to the flanges.

20. The method in accordance with claim 19 and further comprising the steps of forming sixth, seventh, eighth and ninth layers of alternate turns of the forward and reverse segments such that the positions of the turns of the forward and reverse sections of the sixth layer, relative to the side flanges, correspond to the position of the turns of the forward and reverse segments of the second layer, relative to the side flanges, and the positions of the turns of the forward and reverse segments of the seventh layer, relative to the side flanges, correspond to the positions of the turns of the forward and reverse segments of the third layer and the positions of the turns of the forward and reverse segments of the eighth layer, relative to the side flanges, correspond to the positions of the turns of the forward and reverse segments of the fourth layer, relative to the side flanges, and the positions of the turns of the forward and reverse segments of the ninth layer, relative to the side flanges, correspond to the position of the turns of the forward and reverse segments of the fifth layer, relative to the side flanges.

21. The method in accordance with claim 9 wherein the fiber is coated with a bonding agent requiring a curing process for proper activation and wherein the method further comprises the step of applying a bonding process after the step of forming the second layer, thereby bonding adjacent layers of the coil together, and the step of removing the coil from the spool.

22. The method in accordance with claim 9 and further comprising the step of applying a potting compound to the coil and the step of curing the compound and the step of removing the coil from a core after the step of curing.

23. The method in accordance with claim 9 wherein the turns of the fiber are bonded in place with a bonding agent during a bonding process.

24. A method of forming an optical fiber sensing coil comprising a plurality of layers by winding an optical fiber of predetermined length on a spool having a core with axially spaced apart opposite ends, the core having an axis of rotation and an outer surface and a longitudinally extending groove in the outer surface extending between the opposite ends and parallel to the longitudinal axis, the groove having a midpoint substantially equidistant from the opposite ends of the core, the optical fiber having opposite ends and a fiber midpoint substantially equidistant from the opposite ends of the optical fiber and a forward segment disposed on one side of the midpoint of the optical fiber and a reverse segment disposed on another side of the midpoint of the optical fiber, the method comprising the steps of:

placing a portion of the optical fiber in the groove such that the midpoint of the optical fiber is disposed in substantial alignment with the midpoint of the groove;

forming a first layer by winding a portion of the forward segment in one direction in an alternating turns pattern on the outer surface of the core such that adjacent turns of the forward segment are spaced apart by a distance substantially equal to the diameter of the optical fiber and winding a portion of the reverse segment in a direction opposite the one direction in an alternating turns pattern on the outer surface of the core and between the turns of the alternating turns pattern of the forward segment.

25. The method in accordance with claim 24 and further comprising the step of forming additional layers with each additional layer comprising alternate turns of the forward segment and of the reverse segment.

26. The method in accordance with claim 25 wherein the steps of forming the additional layers comprises winding a next layer such that the turns of the next layer are disposed in grooves formed between turns of the immediately preceding layer.

27. A fiber optic coil comprising:

a first plurality of turns of a first segment of an optical fiber;

a second plurality of turns of a second segment of the optical fiber;

the first and second pluralities of turns together forming a plurality of layers of turns of the optical fiber; and, at least one of the layers including alternating, adjacent turns of the first and second segments of the optical fiber.

28. The fiber optic coil according to claim 27 wherein the plurality of layers comprises first, second, third, fourth, and fifth layers of turns of the first and second segments, wherein the turns of the second, third, fourth, and fifth layers of turns are alternating, adjacent turns of the first and second segments, wherein the at least one of the layers is the second layer of turns, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

29. The fiber optic coil according to claim 27 wherein the plurality of layers comprises first, second, third, fourth, and fifth layers of turns of the first and second segments, wherein the turns of the second, third, fourth, and fifth layers of turns are alternating, adjacent turns of the first and second segments, wherein the at least one of the layers is the second layer of turns, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

30. The fiber optic coil according to claim 27 wherein the plurality of layers comprises first, second, third, fourth, and fifth layers of turns of the first and second segments, wherein the turns of the second, third, fourth, and fifth layers of turns are alternating, adjacent turns of the first and second segments, wherein the at least one of the layers is the second layer of turns, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

31. The fiber optic coil according to claim 27 wherein the plurality of layers comprises first, second, third, fourth, and fifth layers of turns of the first and second segments, wherein the turns of the second, third, fourth, and fifth layers of turns are alternating, adjacent turns of the first and second segments, wherein the at least one of the layers is the second layer of turns, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

32. The fiber optic coil according to claim 27 wherein the at least one of the layers is a second layer of turns, wherein the second layer has an even number of turns adjacent to a first layer of turns, and wherein the fiber optic coil further comprises a third layer of an odd number of turns adjacent to the second layer of turns, a fourth layer of an even number of turns adjacent to the third layer of turns, and a fifth layer of an odd number of turns adjacent to the fourth layer of turns.

33. The fiber optic coil according to claim 32 wherein the first layer has an even number of turns.

34. The fiber optic coil according to claim 32 wherein the turns of the second, third, fourth, and fifth layers of turns are alternating, adjacent turns of the first and second segments, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

35. The fiber optic coil according to claim 32 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

36. The fiber optic coil according to claim 27 wherein the at least one of the layers is a second layer of turns, wherein the second layer has an odd number of turns adjacent to a first layer of turns, and wherein the fiber optic coil further comprises a third layer of an even number of turns adjacent to the second layer of turns, a fourth layer of an odd number of turns adjacent to the third layer of turns, and a fifth layer of an even number of turns adjacent to the fourth layer of turns.

37. The fiber optic coil according to claim 36 wherein the first layer has an even number of turns.

38. The fiber optic coil according to claim 36 wherein the turns of the second, third, fourth, and fifth layers of turns are alternating, adjacent turns of the first and second segments, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

39. The fiber optic coil according to claim 27 wherein the at least one of the layers is a second layer of turns, wherein the second layer has an odd number of turns adjacent to a first layer of turns, and wherein the fiber optic coil further comprises a third layer of an odd number of turns adjacent to the second layer of turns, a fourth layer of an odd number of turns adjacent to the third layer of turns, and a fifth layer of an odd number of turns adjacent to the fourth layer of turns.

40. The fiber optic coil according to claim 39 wherein the first layer has an odd number of turns.

41. The fiber optic coil according to claim 39 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

42. The fiber optic coil according to claim 27 wherein the at least one of the layers is a second layer of turns, wherein the second layer has an even number of turns adjacent to a first layer of turns, and wherein the fiber optic coil further comprises a third layer of an even number of turns adjacent to the second layer of turns, a fourth layer of an even number of turns adjacent to the third layer of turns, and a fifth layer of an even number of turns adjacent to the fourth layer of turns.

43. The fiber optic coil according to claim 42 wherein the first layer has an even number of turns.

44. The fiber optic coil according to claim 42 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

45. A fiber optic coil comprising:
   a first plurality of turns of a first segment of an optical fiber;
   a second plurality of turns of a second segment of the optical fiber;
   the first and second pluralities of turns together forming a plurality of layers of turns of the optical fiber; and,
   at least one layer of the plurality of layers including at least first and second groups of plural adjacent turns, wherein all turns in the first group of plural adjacent turns consist of plural adjacent turns of the first segment of the optical fiber, and wherein all turns in the second group of plural adjacent turns consist of plural adjacent turns of the second segment of the optical fiber.

46. The fiber optic coil of claim 45 wherein at least another layer of the plurality of layers includes alternating, adjacent turns of the first and second segments of the optical fiber.

47. The fiber optic coil of claim 45 wherein the at least one layer is a first layer of turns, and wherein the fiber optic coil further comprises a second layer of an even number of turns adjacent to the first layer of turns, a third layer of an odd number of turns adjacent to the second layer of turns, a fourth layer of an even number of turns adjacent to the third layer of turns, and a fifth layer of an odd number of turns adjacent to the fourth layer of turns.

48. The fiber optic coil of claim 47 wherein the first layer has an even number of turns.

49. The fiber optic coil of claim 47 wherein the turns of the second, third, fourth, and fifth layers of turns are alternating, adjacent turns of the first and second segments, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

50. The fiber optic coil of claim 47 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the second segment in the third layer, and wherein the position of the turns of the second segment in the fifth layer corresponds to the position of the turns of the first segment in the third layer.

51. The fiber optic coil of claim 45 wherein the at least one layer is a first layer of turns, and wherein the fiber optic coil further comprises a second layer of an odd number of turns adjacent to the first layer of turns, a third layer of an even number of turns adjacent to the second layer of turns, a fourth layer of an odd number of turns adjacent to the third layer of turns, and a fifth layer of an even number of turns adjacent to the fourth layer of turns.

52. The fiber optic coil of claim 51 wherein the first layer has an even number of turns.

53. The fiber optic coil of claim 51 wherein the turns of the second, third, fourth, and fifth layers of turns are alternating, adjacent turns of the first and second segments, wherein the position of the turns of the first segment in the fourth layer corresponds to the position of the turns of the second segment in the second layer, wherein the position of the turns of the second segment in the fourth layer corresponds to the position of the turns of the first segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

54. The fiber optic coil of claim 45 wherein the at least one layer is a first layer of turns, and wherein the fiber optic coil further comprises a second layer of an odd number of turns adjacent to the first layer of turns, a third layer of an odd number of turns adjacent to the second layer of turns, a fourth layer of an odd number of turns adjacent to the third layer of turns, and a fifth layer of an odd number of turns adjacent to the fourth layer of turns.

55. The fiber optic coil of claim 54 wherein the first layer has an odd number of turns.

56. The fiber optic coil of claim 54 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

57. The fiber optic coil of claim 45 wherein the at least one layer is a first layer of turns, and wherein the fiber optic coil further comprises a second layer of an even number of turns adjacent to the first layer of turns, a third layer of an even number of turns adjacent to the second layer of turns, a fourth layer of an even number of turns adjacent to the third layer of turns, and a fifth layer of an even number of turns adjacent to the fourth layer of turns.

58. The fiber optic coil of claim 57 wherein the first layer has an even number of turns.

59. The fiber optic coil of claim 57 wherein the turns of the second, third, fourth, and fifth layers of turns are alternating, adjacent turns of the first and second segments, wherein the position of the turns of the first segment in the fourth layer corresponds to the position of the turns of the first segment in the second layer, wherein the position of the turns of the second segment in the fourth layer corresponds to the position of the turns of the second segment in the second layer, wherein the position of the turns of the first segment in the fifth layer corresponds to the position of the turns of the first segment in the third layer, and wherein the position of the turns of the second segment in the fifth layer corresponds to the position of the turns of the second segment in the third layer.

60. The fiber optic coil of claim 45 wherein the layers are wound on a spool having flanges at opposite ends thereof, and wherein the at least one layer is wound flange to flange.

61. The fiber optic coil of claim 45 wherein the layers are wound on a spool having first and second flanges at opposite ends thereof, and wherein the at least one layer is wound so that the turns of the at least one layer substantially abut the first flange and are separated from the second flange by a gap.

62. The fiber optic coil of claim 61 wherein the optical fiber has a diameter, and wherein the gap is substantially one half of the diameter of the optical fiber.

63. The fiber optic coil of claim 62 wherein the layers beyond the at least one layer include a pattern having an odd number of turns, an even number of turns, an odd number of turns, an even number of turns, and so on.

64. The fiber optic coil of claim 62 wherein the layers beyond the at least one layer include a pattern having an even number of turns, an odd number of turns, an even number of turns, an odd number of turns, and so on.

* * * * *

UNITED STATES PATENT AND TRADEMARK OFFICE
CERTIFICATE OF CORRECTION

PATENT NO. : 5,841,932
DATED : November 24, 1998
INVENTOR(S) : Jerry L. Page et al.

It is certified that error appears in the above-indentified patent and that said Letters Patent is hereby corrected as shown below:

Drawing sheets, consisting of Figs. 2-3, should be deleted to be replaced with the Drawing Sheets, consisting of Figs. 2-3, as shown on the attached pages.

Signed and Sealed this

Twenty-eighth Day of September, 1999

*Attest:*

Q. TODD DICKINSON

*Attesting Officer*      *Acting Commissioner of Patents and Trademarks*

Fig.2

Fig.3